US008032072B2

(12) United States Patent
Thibodeau et al.

(10) Patent No.: US 8,032,072 B2
(45) Date of Patent: Oct. 4, 2011

(54) SYSTEM FOR DOWNLOADING AUDIO CONTENT

(75) Inventors: Christopher Thomas Thibodeau, Plymouth, MI (US); J. William Whikehart, Milford, MI (US); Shadi Mere, Ypsilanti, MI (US); Jonathan Weisberg, Bloomfield Hills, MI (US); Theodore Charles Wingrove, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 766 days.

(21) Appl. No.: 12/142,061

(22) Filed: Jun. 19, 2008

(65) Prior Publication Data
US 2009/0320067 A1 Dec. 24, 2009

(51) Int. Cl.
*H04H 1/00* (2006.01)
(52) U.S. Cl. .............. 455/3.01; 455/3.06; 455/160.1; 455/179.1; 455/6.3; 709/217; 725/25; 725/44
(58) Field of Classification Search ............ 455/3.01, 455/3.02, 3.06, 412.1, 414.1, 414.3, 418, 455/420, 456.2, 160.1, 179.1, 277.1, 6.3; 725/34, 44, 25, 46, 9; 709/217, 219
See application file for complete search history.

(56) References Cited

U.S. PATENT DOCUMENTS

| | | | |
|---|---|---|---|
| 6,407,750 B1* | 6/2002 | Gioscia et al. | 715/716 |
| 2002/0133477 A1* | 9/2002 | Abel | 707/1 |
| 2005/0004873 A1 | 1/2005 | Pou et al. | |
| 2005/0049972 A1 | 3/2005 | Hsu et al. | |
| 2006/0206582 A1* | 9/2006 | Finn | 709/217 |
| 2006/0271958 A1* | 11/2006 | Ukai et al. | 725/46 |
| 2006/0287956 A1 | 12/2006 | Higashi et al. | |
| 2007/0005775 A1 | 1/2007 | Philips | |
| 2007/0033147 A1 | 2/2007 | Kaburagi | |
| 2007/0155311 A1 | 7/2007 | Christensen et al. | |
| 2008/0052739 A1* | 2/2008 | Logan | 725/25 |
| 2008/0092168 A1* | 4/2008 | Logan et al. | 725/44 |
| 2009/0210902 A1* | 8/2009 | Slaney et al. | 725/34 |
| 2011/0082807 A1* | 4/2011 | Parekh et al. | 705/319 |

* cited by examiner

*Primary Examiner* — Tan Trinh
(74) *Attorney, Agent, or Firm* — Dickinson Wright PLLC

(57) ABSTRACT

A method for recording a clean broadcast free of background, such as fade-ins and fade-outs on a receiver includes providing program data associated with an upcoming broadcast, the broadcast being selected by a broadcaster, on the receiver to describe the upcoming broadcast to a user. The receiver records the upcoming broadcast to an internal memory of the receiver in response to either the broadcast being automatically selected based on the user's preferences or the user manually selecting the upcoming broadcast. Start and stop commands, independent of any manual input, are received by the receiver to begin and end the recording of the clean broadcast.

29 Claims, 1 Drawing Sheet

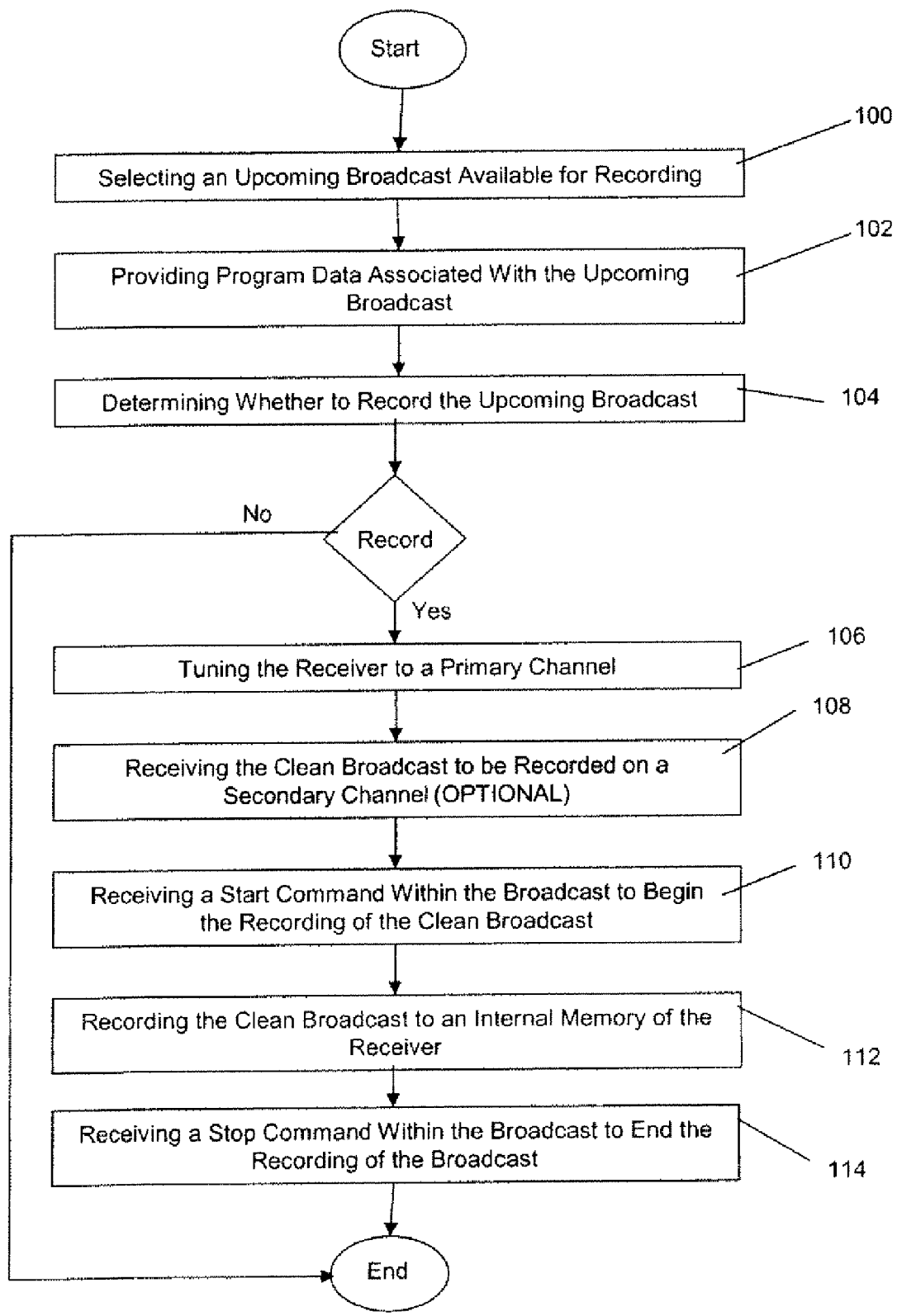

SYSTEM FOR DOWNLOADING AUDIO CONTENT

BACKGROUND OF THE INVENTION

1. Field of the Invention

The subject invention relates to a method for recording a clean broadcast free of background, such as advertisements, fade-ins, and fade-outs on a receiver while the user listens to the normal broadcast.

2. Discussion

Broadcasters commonly provide content to users for entertainment. This content may have interspaced advertisements, fade-ins, fade-outs or other background items placed within the content. The broadcast content may also include noise or other interferences. Users listening to the radio or watching television may particularly like a broadcast that they would like to download, replay or possibly purchase for later use. While broadcasters commonly provide station call letters, the name of the broadcast, artist, or album to the receiver, the user currently has no easy way to download or purchase the broadcast. Instead, the user must typically write down or remember the identifying information and then go to a store or online retailer to purchase the broadcast, such as a song, album, audio book, news cast, pod-cast, video, movie, or any other desired broadcast. Not only is this inconvenient, but the user may forget the name of the broadcast or not be able to find a store that sells the content that was broadcasted. Additionally, the information provided by the broadcaster may not be enough to sufficiently identify the broadcast. For example, the user may have the title, but not the artist name, or other necessary identifying information and too many search results may appear for the user to efficiently find the desired broadcast. Some material, such as editorial news broadcasts or live events, may not be available for purchase or may be difficult to find.

Broadcasters also have problems providing promotional content to users, such as part of fund raisers, promotions, advertisements, or other marketing endeavors. Currently, broadcasters must direct users to a website, which requires special updating and may be difficult for a user to remember the domain name or find the content on the website. In addition, if a customer of a broadcaster wants the broadcaster to describe free content as part of a marketing campaign, the broadcaster is limited to providing the content over the web and therefore, limited in the amount of revenue received from the marketing campaign.

Some methods do currently exist wherein a user may select or tag a broadcast for purchase but generally they are complex and difficult to use. One such method uses a portable music device that is capable of capturing songs tags or program data while monitoring an AM/FM broadcast on the receiver for later downloading of the broadcast. In this method, the user selects their favorite songs as they are being played on the radio station and then must download the exact song from an Internet connected PC linking to the radio station server.

Another such method requiring an internet connected PC allows a user to interact with a data packet or broadcast data associated with a broadcast to allow the user to purchase the associated broadcast or make a pledge to a fund raiser. The broadcast once identified and paid for is downloaded to the receiver via an internet connection.

Additionally, users such as listeners or viewers of broadcast sometimes want to be able to record ("rip") broadcast from the broadcast signals for later playback. Various solutions allow viewers and listeners to do this, but this requires manual editing and title marking to make the recorded broadcast desirable. Fade-ins, fade-outs and voice-overs in the broadcast signal prevent the recorded broadcast from matching the broadcast as produced. Fade-ins, fade-outs and voice-overs are part of the overall presentation of the broadcast and broadcasters have no incentive to provide clean broadcast for the users, Additionally, users do not know what broadcast is coming up next, so they do not know whether to be ready to rip the next broadcast, nor when to start or stop to record a broadcast that is free of background, such as fade-ins, fade-outs and voice-overs.

As such, it is desirable to have an improved method for recording a clean broadcast on a receiver that does not require manual input for starting and stopping the recording of the broadcast, is capable of complying with copyright restrictions, is able to be part of a promotion or campaign by the broadcaster or a client of the broadcaster, and further does not require a fee or subscription to later purchase the broadcast for playback on other devices.

SUMMARY OF THE INVENTION AND ADVANTAGES

The present invention solves the above describe problems as well as other problems by providing a method that allows a user to easily record a clean broadcast without any manual input being required from the user. The present invention is a method for recording a clean broadcast free of background on a receiver. An upcoming broadcast is selected by a broadcaster to be made available for recording on a receiver. Program data associated with the upcoming broadcast is then provided on the receiver to describe the upcoming broadcast to a user. The receiver then determines whether or not to record the upcoming broadcast in response to either the broadcast being automatically selected based on a users input and previous recording performances or manually selecting the upcoming broadcast to be recorded. With the receiver tuned to a primary channel where the selected upcoming broadcast will be aired, a start command within the broadcast is received by the receiver to begin the recording of the clean broadcast, typically on a second channel. The clean broadcast is recorded to an internal memory of the receiver, and recording stops upon receiving a stop command within the broadcast.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated and more fully understood by reference to the following detailed description when considered in connection with the accompanying drawing wherein:

FIG. 1 is a flow chart of an exemplary method of recording a clean broadcast free of background on a receiver.

DETAILED DESCRIPTION OF THE INVENTION

The present invention is generally directed to a method for recording a clean broadcast free of background on a receiver. In summary, the method typically starts with a broadcaster selecting an upcoming broadcast to be made available for recording on a receiver. Program data associated with the upcoming broadcast is provided to the receiver, describing the upcoming broadcast Of course, this program data may be provided audibly to the user. The receiver then determines whether or not to record the upcoming broadcast based on preferences, past selection or in response to a manual input from the user. When the upcoming broadcast is to be recorded, the receiver is then tuned to a primary channel where the selected upcoming broadcast related to the desired clean broadcast, will be aired. A start command within the broadcast is then received by the receiver to begin the recording of the clean broadcast to an internal memory of the receiver. A stop command within the broadcast is received in the receiver to end the recording of the broadcast. The user may then have a variety of options available regarding how to interact with the broadcast.

In response to a marketing program, advertising program, fund-raiser or other program, a broadcaster may desire to provide free content to a user. The broadcaster may be any media content provider, including but not limited to, music labels, radio stations, television studios, cable providers, and cell phone providers. The broadcast may be any content that broadcaster can provide, including but not limited to songs, television programs, movies, games, and ring tones. In some embodiments, a broadcaster may wish to provide a news program, interview, audio book or similar broadcast to a user for later enjoyment. Therefore, in the exemplary method set forth in FIG. 1, the first step 100 is generally to identify and select content to be provided to a user. The broadcast may be provided free of restrictions, with restrictions, clean of advertisements and the date or with the advertisements.

The receiver may be any device capable of receiving broadcast content including but not limited to radio receivers, televisions, and cell phones, and capable of storing recorded copies of the broadcast either internally or to an external storage device. In the exemplary method, the broadcaster is providing a free broadcast and no subscription or credit card is required to record the broadcast. Of course, a variety of other models may also be used, such as where the user subscribes to the rights to record broadcasts or a particular broadcast. As the present invention is directed to all types of broadcast that are not provided over the internet, satellite users and cable users may pay subscription fees for the basic service of receiving the satellite or cable broadcast. Typically this basic fee is for the right to receive the broadcast and is independent of the right to record the broadcast. Providing a broadcast to the user without fees and subscriptions to record the broadcast increases the available audience and customers as well as the number of companies desiring to provide content and advertisement to users. More specifically this provides broadcasters and advertisers with an incentive to provide free broadcast to a user in return for the user listening to the advertisement or participating in other promotional endeavors. The user may be any listener, viewer, or owner of a receiver capable of receiving the broadcast content.

Program data associated with an upcoming broadcast is provided to the receiver from the broadcaster to describe the upcoming broadcast to the user in step 102. The providing of program data step 102 may be further defined as providing at least one of the upcoming broadcast time, title, genre, artist, year, album, IP address for where broadcast can be purchased for use on other devices, or primary channel to the user. The process of tagging digital audio files with this information is commonly known as ID3 tagging. One example of this data transmission along with the broadcast signal is disclosed in the United States Radio Broadcast Data Systems ("RBDS") standard. The RBDS standard describes a system for broadcasting a variety of program related information in a subcarrier of a standard FM broadcast channel. Thus, it is possible to a broadcaster to provide this program data while receiver is receiving a broadcast.

The program data may be displayed a receiver display prior to or during the broadcast. In an exemplary embodiment, the providing program data step 102 may be further defined as providing the program data through an advertisement prior to the upcoming broadcast. In such a case, the broadcaster can advertise that a broadcast, typically a clean broadcast, will be available for free recording at a certain time and station to users who are tuned in at that time.

The method may optionally include a step of receiving promotional content with the broadcast. Promotional content, includes but is not limited to, information regarding fund raisers, promotions, product or service advertisements, or other marketing endeavors The promotional content may be displayed during the broadcast on the receiver display using the RBDS standard discussed above or received prior to or immediately following the broadcast through an advertisement. In an exemplary method, the broadcaster may have a system wherein order to receive the free clean broadcast, the user must be tuned to the primary channel to hear the promotional content in order to receive the free broadcast. This would provide advertisers with the incentive to provide free content to users, in return for knowing that their advertisement will be heard. Advertisers would be able to advertise their product or service with a broadcast tailored to those likely to use their product. For example, the producer of an high energy soft drink or snowboard could advertise their product with a free download of an alternative genre song that they believe would be interesting to the audience interested in using their product.

In step 104, the receiver determines whether to record the upcoming broadcast. The receiver may automatically choose to record the upcoming broadcast, or the user may manually select the upcoming broadcast. The method may include an optional step of creating a user profile based on input from the user. Based on the user profile, the receiver may automatically determine whether to record the upcoming broadcast. The user profile may be generated through a series of questions to the user to determine the user's preferences in regard to broadcast genre or artist. Further, the user profile may be based on previous selections by the user. For example, the receiver may choose to record a broadcast by an artist genre, album, that the user has previously chosen to record a broadcast of, as long as the user meets the requirements for recording the broadcast, such as being tuned into the primary channel for which the broadcast will air.

Additionally, the user may manually select the upcoming broadcast to be recorded. The receiver may include a button wherein a user may select the upcoming broadcast to be recorded based on receiving the program data associated with the upcoming broadcast. For example, the broadcaster may advertise that a free clean version of a particular broadcast will be provided at a certain time on a primary channel. The user has the option while the program data is being provided or after the programming data is provided to select that broadcast, by pushing a designated capture button, for recording. This manual input would be valuable to broadcasters in determining accurate user profiles and give the broadcaster's sales team important data when selling the advertising time.

The method may further include the optional step of determining not to record the upcoming broadcast when the upcoming broadcast already exists in the internal memory or has already been received. In the exemplary method, the program data associated with the recorded broadcast may also be recorded and stored to the internal memory. One such way it may be stored is by generating a list of all previously recorded broadcast and program data associated with the previously recorded broadcast. The list may then be used to compare the upcoming broadcast and program data associated with upcoming broadcast with the list of previously recorded broadcast and program data associated with the previously recorded broadcast to determine whether the upcoming recorded broadcast has been previously recorded or transferred and if previously recorded or transferred not recording the upcoming broadcast.

Referring again to FIG. 1, the method further includes the step 106 of tuning the receiver to the primary channel providing the selected upcoming broadcast. This tuning may be automatically tuned based on user preference or manually tuned by the user. In addition, the broadcaster may optionally provide a reminder to the user that the upcoming broadcast will soon be aired, so that the user may tune the receiver to the primary channel at the appropriate time to record the broadcast. One such way would be with a reminder being displayed on the receiver display. In the exemplary method, the unclean version of the broadcast is viewed or listened to by the user on the primary channel while a clean version of the broadcast may be received on a secondary channel to be recorded, as shown in optional step 108. The unclean version of the broadcast includes voice-overs, fade-ins and fade-outs which are typically in most broadcast.

The method may further include a feature which optionally locks the receiver to the primary channel on which the broadcast is provided until the recording of the broadcast is complete. For example, once the user has selected a broadcast to be recorded and has tuned to the primary on which the broadcast will be aired, the receiver is locked such that the receiver may not be retuned until the broadcast and promotional content associated the broadcast is complete. Locking the receiver to the primary channel through the entire broadcast would ensure that the user is tuned to the primary channel during the presentation of the promotional content.

Alternatively, the method may allow for retuning the receiver from the primary channel to another channel during the recording the broadcast step in order to terminate the recording of the broadcast. For example, a user may decide while listening to a particular broadcast, that he is no longer interested. As such, the user may retune his receiver, and in doing so, cancel the recording of the free broadcast. Retuning the receiver during either the broadcast or the promotional content could terminate the recording, Again this would insure that the user would listen to or view the entire broadcast along with promotional content in order to have the recorded broadcast for later playback. This allows advertiser or those providing promotional content to be sure that in return for the free broadcast that they are providing that the message they intended to provide is heard.

Once it is determined that a broadcast is to be recorded, a start command is received by the receiver to begin the recording of the clean broadcast in step 110. The start command may be independent of any manual input and may be within the broadcast itself. For example, the broadcast may include a signal that communicates with the receiver to begin the recording of the broadcast. After the user has manually selected the upcoming broadcast or the receiver has automatically selected the upcoming broadcast to be recorded a start command is provided by the broadcaster so that the receiver records the desired broadcast. This is different from many methods known in the prior art wherein a user must choose the exact moment to begin recording. This can be difficult based on the fade-ins and voice-overs associated with broadcast. In an alternative embodiment, the start command is sent by the broadcaster as a GPS-based start time, with the receiver using a GPS system within the vehicle to locally determine when to start recording. One such GPS system includes, but is not limited to, a navigation system. Additionally, the method may provide the optional step of providing a short audio mute immediately following the receiving a start command step 110 to assist in providing the clean recording.

In step 112, the clean broadcast is recorded to the internal memory of the receiver. The method may include the optional step of indicating to the user on the receiver display that the broadcast is being recorded. As discussed above, in the exemplary embodiment, the unclean version of the broadcast is viewed or listened to by the user on the primary channel while a clean version of the broadcast to be recorded may be received on a secondary channel.

Once it is determined that a broadcast has been recorded a stop command is received to end the recording of the clean broadcast in step 114. The stop command may be independent of any manual input and may be within the broadcast itself. For example, the broadcast may include a signal that communicates with the receiver to end the recording of the broadcast. After the desired broadcast has been recorded the stop command is provided so that the receiver automatically ends the recording the desired broadcast. This is different from many methods known in the prior art wherein a user must choose the exact moment to end the recording. This can be difficult based on the fade-outs and voice-overs associated with broadcast. In an alternative embodiment, the stop command is sent by the broadcaster as a GPS-based stop time, with the receiver using a GPS system within the vehicle to locally determine when to stop recording. One such GPS system includes, but is not limited to, a navigation system. In another embodiment, the broadcast sends a current time and time to start and stop recording of the broadcast. This may be done with the use of time deltas for the start and stop times with respect to the current local time maintained by the receiver. The receiver then maintains a real time-clock, already present in the receiver, with sufficient accuracy to start and stop the recording. Additionally, the method may provide the optional step of providing a short audio mute preceding the receiving a stop command step 114 to assist in providing the clean recording.

Once the broadcast has been recorded and stored, the user has a variety of options. For example, the recorded broadcast may remain in the internal memory of the receiver until the user deletes the broadcast. As long as the broadcast remains in the internal memory of the receiver the user would be able to play the broadcast on that receiver for their entertainment.

Additionally, the method may include the optional step of transferring the program data to an external device separate from the receiver allow the user to purchase the broadcast associated with the program data for play on other devices. While the broadcast remains on the receiver the program data along with any restriction associated with the broadcast may be transfer to a secondary device for purchase of the broadcast. Restrictions may be provided to protect the content from piracy. In the exemplary embodiment, after recording a free clean broadcast on a car receiver, a user may download program data such as song artist and title to a secondary device which allows the user to purchase that song for play on other devices including but not limited to other receivers, MP3 players, and computers.

Additionally, the method may include an optional step of storing the recorded broadcast in the internal memory for later playback of the recorded broadcast for a predetermined period. The predetermined period may be a set number of playbacks or a set amount of time. After the predetermined period has expired the recorded broadcast may be deleted from the internal memory while the program data associated with the deleted broadcast is retained in the internal memory of the receiver. Retaining the program data would allow the user to transfer the program data associated with the deleted broadcast to an external device separate from the receiver to allow the user to purchase the deleted broadcast. So even if a broadcast has been deleted from the receiver, the user may still purchase the broadcast using the program data associated with the deleted broadcast.

In summary, the exemplary method allows for the user to record a clean broadcast free of background on a receiver. The broadcaster and the advertiser may meet and determine whether to provide a clean broadcast for a user to record. The advertiser would work with the broadcaster to determine what broadcast to provide and when to provide it. The broadcaster would then advertise to the user, through an announcement over the air waves or through a text message on a radio display, that a particular broadcast would be available for recording at a certain time and on primary channel. Based the user's previous selections, the receiver may automatically determine to record the broadcast, or the user may push a capture button on the receiver to notify the receiver of its desire to have a particular broadcast recorded. At the time the broadcast is to be aired the receiver is tuned to the primary channel on which the broadcast will be aired. Once tuned to the primary channel at the specified time, the broadcaster will provide its normal broadcast, complete with fade-ins, fade-outs, and advertisement to the user on the primary channel, while a clean version is recorded from a secondary channel associated with the primary channel. Again, no input is required by the user to start and stop the recording. The advertiser will also provide promotional content, before, during or after the broadcast. The promotional content allows the user to know who is providing the free content along with allowing the advertiser to advertise a product or cause. Once the broadcast has been recorded, it is stored in an internal memory so that the user can later playback that recording on the receiver. Additionally, the user may transfer the program data associated with the broadcast to a secondary device in order to purchase to the broadcast for play on other devices.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for recording a clean broadcast free of background on a receiver comprising the steps of:
   selecting an upcoming broadcast available for recording on a receiver by a broadcaster;
   providing program data associated with the upcoming broadcast to the receiver to describe the upcoming broadcast to a user;
   determining whether to record the upcoming broadcast by the receiver in response to one of automatically selecting the upcoming broadcast to be recorded or manually selecting the upcoming broadcast to be recorded;
   tuning the receiver to a primary channel providing the selected upcoming broadcast;
   receiving a start command to begin the recording of the clean broadcast wherein the start command is independent of any manual input;
   recording the clean broadcast to an internal memory of the receiver; and
   receiving a stop command within the broadcast to end the recording of the broadcast.

2. A method as set forth in claim 1 further comprising the step of receiving the broadcast to be recorded on a secondary channel.

3. A method as set forth in claim 2 wherein the clean broadcast is recorded from the secondary channel while the user receives an unclean broadcast with background on the primary channel.

4. A method as set forth in claim 1 wherein the providing program data step is further defined as providing at least one of upcoming broadcast time, title, genre, artist, and primary channel to the user.

5. A method as set forth in claim 4 further comprising the step of displaying the program data on a receiver display.

6. A method as set forth in claim 4 wherein the providing program data step is further defined as providing the program data through an advertisement prior to the upcoming broadcast.

7. A method as set forth in claim 4 further comprising the step of recording the program data associated with the recorded broadcast in the internal memory.

8. A method as set forth in claim 7 further comprising the step of transferring the program data to an external device separate from the receiver to allow the user to purchase the broadcast associated with the program data for play on other devices.

9. A method as set forth in claim 1 further including the step of choosing the recorded broadcast from the internal memory for clean playback on the receiver.

10. A method as set forth in claim 1 further comprising the step of storing the recorded broadcast in the internal memory for later playback of the recorded broadcast for a predetermined period.

11. A method as set forth in claim 10 wherein the predetermined period is at least one of a set number of playbacks and a set amount of time.

12. A method as set forth in claim 10 further comprising the steps of:
   recording the program data associated with the recorded broadcast in the internal memory;
   deleting the recorded broadcast from the internal memory while retaining the program data associated with the deleted broadcast in the internal memory of the receiver after the predetermined period has expired; and
   transferring the program data associated with the deleted broadcast to an external device separate from the receiver to allow the user to purchase the deleted broadcast.

13. A method as set forth in claim 1 wherein the determining whether to record step is further defined as automatically selecting the upcoming broadcast to be recorded utilizing a user profile based on input from the user.

14. A method as set forth in claim 1 wherein the determining whether to record step is farther defined as manually selecting the broadcast to be recorded by the user.

15. A method as set forth in claim 1 wherein the determining whether to record step is further defined as determining not to record the upcoming broadcast when the upcoming broadcast exist in the internal memory.

16. A method as set forth in claim 15 further comprising the steps of:
   generating a list of all previously recorded broadcast and program data associated with the previously recorded broadcast; and comparing the upcoming broadcast and program data associated with upcoming broadcast to the list of previously recorded broadcast and program data associated with the previously recorded broadcast to determine whether the upcoming recorded broadcast has been previously recorded or transferred and if previously recorded or transferred not recording the upcoming broadcast.

17. A method as set forth in claim 1 further comprising the steps of:
receiving promotional content with the broadcast; and
displaying the promotional content during the broadcast on a receiver display.

18. A method as set forth in claim 1 further comprising the step of receiving promotional content prior to the broadcast.

19. A method as set forth in claim 1 further comprising the step of providing a short audio mute at a period at least one of immediately following the receiving a start command step and immediately proceeding the receiving a stop command step to provide the clean recording.

20. A method as set forth in claim 1 further comprising the step of locking the receiver to the primary channel on which the broadcast is provided until the receiving the stop command step is completed.

21. A method for recording a clean broadcast free of background on a receiver comprising the steps of:
selecting an upcoming broadcast available for recording on a receiver by a broadcaster;
providing program data associated with the upcoming broadcast to the receiver to describe the upcoming broadcast to a user;
determining whether to record the upcoming broadcast by the receiver in response to one of automatically selecting the upcoming broadcast to be recorded or manually selecting the upcoming broadcast to be recorded;
tuning the receiver to a primary channel providing the selected upcoming broadcast,
receiving a start command within the broadcast to begin the recording of the clean broadcast;
recording the clean broadcast to an internal memory of the receiver; and
receiving a stop command within the broadcast to end the recording of the broadcast;
wherein at least one of the start command and stop command are independent of any manual input.

22. A method as set forth in claim 21 further comprising the step of receiving the broadcast to be recorded on a secondary channel, and wherein the clean broadcast is recorded from the secondary channel while the user receives the unclean broadcast with background on the primary channel.

23. A method as set forth in claim 21 wherein the providing program data step is further defined as providing at least one of upcoming broadcast time, title, genre, artist, and primary channel to the user.

24. A method as set forth in claim 21 further comprising the step of storing the recorded broadcast in the internal memory for later playback of the recorded broadcast for a predetermined period.

25. A method as set forth in claim 24 further comprising the steps of:
recording the program data associated with the recorded broadcast in the internal memory; and
deleting the recorded broadcast from the internal memory while retaining the program data associated with the deleted broadcast in the internal memory of the receiver after the predetermined period has expired.

26. A method as set forth in claim 25 further comprising the step of transferring the program data associated with the deleted broadcast to an external device separate from the receiver to allow the user to purchase the deleted broadcast.

27. A method for recording a clean broadcast free of background on a receiver comprising the steps of:
selecting an upcoming broadcast available for recording on a receiver by a broadcaster;
providing program data associated with the upcoming broadcast to the receiver to describe the upcoming broadcast to a user, the program data including at least one of broadcast time, title, genre, artist, and primary channel to the user;
determining whether to record the upcoming broadcast by the receiver in response to one of automatically selecting the upcoming broadcast to be recorded or manually selecting the upcoming broadcast to be recorded;
tuning the receiver to a primary channel providing the selected upcoming broadcast;
receiving the clean broadcast to be recorded on a secondary channel associated with the primary channel;
receiving a start command within the broadcast to begin the recording of the clean broadcast;
recording the clean broadcast to an internal memory of the receiver; and
receiving a stop command within the broadcast to end the recording of the broadcast;
wherein the clean broadcast is recorded from the secondary channel while the user receives the unclean broadcast on the primary channel.

28. A method as set forth in claim 27 further comprising the step of storing the recorded broadcast in the internal memory for later playback of the recorded broadcast for a predetermined period.

29. A method as set forth in claim 28 further comprising the steps of:
recording the program data associated with the recorded broadcast in the internal memory; and
deleting the recorded broadcast from the internal memory while retaining the program data associated with the deleted broadcast in the internal memory of the receiver after the predetermined period has expired.

* * * * *